US009881393B2

United States Patent
Qian et al.

(10) Patent No.: US 9,881,393 B2
(45) Date of Patent: Jan. 30, 2018

(54) METHOD, APPARATUS, AND TERMINAL DEVICE FOR DETERMINING COLOR OF INTERFACE CONTROL

(71) Applicant: Huawei Device (Dongguan) Co., Ltd., Dongguan (CN)

(72) Inventors: Kai Qian, Beijing (CN); Jianhua Li, Shenzhen (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days.

(21) Appl. No.: 14/981,542

(22) Filed: Dec. 28, 2015

(65) Prior Publication Data

US 2016/0117849 A1    Apr. 28, 2016

Related U.S. Application Data (63) Continuation of application No. PCT/CN2014/074297, filed on Mar. 28, 2014.

(51) Int. Cl.

| | |
|---|---|
| *G06T 11/00* | (2006.01) |
| *G06F 3/0481* | (2013.01) |
| *G06F 9/44* | (2006.01) |
| *G06F 9/445* | (2006.01) |

(52) U.S. Cl.
CPC .......... *G06T 11/001* (2013.01); *G06F 3/0481* (2013.01); *G06F 9/4443* (2013.01); *G06F 9/44594* (2013.01)

(58) Field of Classification Search
CPC ....... G06T 11/001; G09G 5/02; G06F 3/0481; G06F 9/4443
See application file for complete search history.

(56) References Cited

U.S. PATENT DOCUMENTS

| 6,721,446 B1 * | 4/2004 | Wilensky ............... G06K 9/342 |
| | | 345/613 |
| 2006/0044324 A1 | 3/2006 | Shum et al. |
| 2007/0031032 A1 | 2/2007 | Oh et al. |
| 2012/0154420 A1 | 6/2012 | Calandrino et al. |

FOREIGN PATENT DOCUMENTS

| CN | 101118496 A | 2/2008 |
| CN | 102262536 A | 11/2011 |
| CN | 102662643 A | 9/2012 |
| EP | 2592539 A2 | 5/2013 |

* cited by examiner

*Primary Examiner* — Antonio A Caschera
(74) *Attorney, Agent, or Firm* — Leydig, Voit & Mayer, Ltd.

(57) ABSTRACT

Embodiments of the disclosure provide a method and an apparatus for determining a color of an interface control, which can enhance visual attraction of a user interface and improve user experience. The method includes: acquiring at least one pixel from a desktop wallpaper; acquiring a color value of the at least one pixel; and determining a color value of each pixel in the interface control according to the color value of the at least one pixel. At least one pixel is determined from a desktop wallpaper, and a color of an interface control is determined according to a color value of the at least one pixel, so that color and style matching between the desktop wallpaper and the interface control can be implemented, thereby enhancing visual attraction of a user interface and improving user experience.

17 Claims, 3 Drawing Sheets

METHOD, APPARATUS, AND TERMINAL DEVICE FOR DETERMINING COLOR OF INTERFACE CONTROL

CROSS-REFERENCE TO RELATED APPLICATIONS

This application is a continuation of International Patent Application No. PCT/CN2014/074297, filed on Mar. 28, 2014, which is hereby incorporated by reference in it entirety.

TECHNICAL FIELD

The present disclosure relates to the multimedia field, and in particular, to a method and an apparatus for determining a color of an interface control in a user interface.

BACKGROUND

With wide popularization of smart terminal devices, visual attraction of a user interface of an operating system of a smart terminal device becomes more important.

In a current smart terminal device, visual attraction of a user interface is improved by using a desktop wallpaper and a theme (which is mainly an interface control) of a user interface.

A user can set a desktop wallpaper according to a personal preference. However, if the user wants to change an interface control, a theme with a given style has to be used. Therefore, consistency of color and style of the desktop wallpaper and the interface control cannot be ensured, and a case may even occur in which color and style of the user's favorite desktop wallpaper mismatch those of a given interface control, which reduces visual attraction of a user interface and seriously affects user experience.

SUMMARY

Embodiments of the present disclosure provide a method, an apparatus, and a terminal device for determining a color of an interface control, which can enhance visual attraction of a user interface and improve user experience.

According to a first aspect, a method for determining a color of an interface control is provided, where the method includes: acquiring at least one pixel from a desktop wallpaper; acquiring a color value of the at least one pixel; and determining a color value of each pixel in the interface control according to the color value of the at least one pixel.

With reference to the first aspect, in a first implementation manner of the first aspect, the acquiring at least one pixel from a desktop wallpaper includes: acquiring a target image block from the desktop wallpaper according to a preset rule, where the target image block includes the at least one pixel.

With reference to the first aspect and the foregoing implementation manner, in a second implementation manner of the first aspect, the acquiring a target image block from the desktop wallpaper according to a preset rule includes: acquiring the target image block from the desktop wallpaper according to a preset position; and/or acquiring the target image block from the desktop wallpaper according to a preset size.

With reference to the first aspect and the foregoing implementation manner, in a third implementation manner of the first aspect, the acquiring the target image block from the desktop wallpaper according to a preset position includes: acquiring the target image block from the desktop wallpaper according to a position of the interface control on a screen, so that a position of the target image block in the desktop wallpaper is corresponding to the position of the interface control on the screen.

With reference to the first aspect and the foregoing implementation manner, in a fourth implementation manner of the first aspect, the acquiring the target image block from the desktop wallpaper includes: acquiring the target image block from the desktop wallpaper according to a size of the interface control, so that a size of the target image block is larger than or equal to the size of the interface control.

With reference to the first aspect and the foregoing implementation manners, in a fifth implementation manner of the first aspect, if a quantity of the pixel is one, the determining a color value of each pixel in the interface control according to the color value of the at least one pixel includes: using the color value of the pixel as the color value of each pixel in the interface control; or if a quantity of the pixel is at least two, the determining a color value of each pixel in the interface control according to the color value of the at least one pixel includes: using color values of the at least two pixels as a color value of each corresponding pixel in the interface control.

With reference to the first aspect and the foregoing implementation manner, in a sixth implementation manner of the first aspect, the method further includes: performing first processing on the color value of each pixel in the interface control, and acquiring a color value of each pixel after the first processing, where the first processing includes at least one of the following processing: blurring processing, transparent processing, blackening processing, or color-changing processing.

With reference to the first aspect and the foregoing implementation manners, in a seventh implementation manner of the first aspect, if a quantity of the pixel is at least two, the determining a color value of each pixel in the interface control according to the color value of the at least one pixel includes: determining a target color value according to color values of the at least two pixels; and determining the color value of each pixel in the interface control according to the target value color.

With reference to the first aspect and the foregoing implementation manner, in an eighth implementation manner of the first aspect, the determining a target color value according to color values of the at least two pixels includes: performing calculation on the color values of the at least two pixels according to a preset algorithm, and using a result of the calculation as the target color value, where the algorithm includes: using a color value that appears most from the color values of the at least two pixels as the target color value; or calculating an average of the color values of the at least two pixels, and using the average as the target color value.

With reference to the first aspect and the foregoing implementation manner, in a ninth implementation manner of the first aspect, the determining the color value of each pixel in the interface control according to the target value color includes: performing second processing on the target color value, and using a target color value after the second processing as the color value of each pixel in the interface control, where the second processing includes at least one of the following processing: blurring processing, transparent processing, blackening processing, or color-changing processing.

According to a second aspect, an apparatus for determining a color of an interface control is provided, where the apparatus includes: a pixel acquiring unit, configured to acquire at least one pixel from a desktop wallpaper; a color value acquiring unit, configured to acquire a color value of the at least one pixel; and a color value determining unit, configured to determine a color value of each pixel in the interface control according to the color value of the at least one pixel.

With reference to the second aspect, in a first implementation manner of the second aspect, the pixel acquiring unit is specifically configured to acquire a target image block from the desktop wallpaper according to a preset rule, where the target image block includes the at least one pixel.

With reference to the second aspect and the foregoing implementation manner, in a second implementation manner of the second aspect, the pixel acquiring unit is configured to acquire the target image block from the desktop wallpaper according to a preset position; and/or acquire the target image block from the desktop wallpaper according to a preset size.

With reference to the second aspect and the foregoing implementation manner, in a third implementation manner of the second aspect, the pixel acquiring unit is configured to acquire the target image block from the desktop wallpaper according to a position of the interface control on a screen, so that a position of the target image block in the desktop wallpaper corresponds to the position of the interface control on the screen.

With reference to the second aspect and the foregoing implementation manner, in a fourth implementation manner of the second aspect, the pixel acquiring unit is configured to acquire the target image block from the desktop wallpaper according to a size of the interface control, so that a size of the target image block is larger than or equal to the size of the interface control.

With reference to the second aspect and the foregoing implementation manners, in a fifth implementation manner of the second aspect, if a quantity of the pixel is one, the color value determining unit is configured to use the color value of the pixel as the color value of each pixel in the interface control; or if a quantity of the pixel is at least two, the color value determining unit is configured to use color values of the at least two pixels as a color value of each corresponding pixel in the interface control.

With reference to the second aspect and the foregoing implementation manner, in a sixth implementation manner of the second aspect, the color value determining unit is further configured to: perform first processing on the color value of each pixel in the interface control, and acquire a color value of each pixel after the first processing, where the first processing includes at least one of the following processing: blurring processing, transparent processing, blackening processing, or color-changing processing.

With reference to the second aspect and the foregoing implementation manners, in a seventh implementation manner of the second aspect, if a quantity of the pixel is at least two, the color value determining unit is specifically configured to determine a target color value according to color values of the at least two pixels; and determine a color of the interface control according to the target color value.

With reference to the second aspect and the foregoing implementation manner, in an eighth implementation manner of the second aspect, the color value determining unit is configured to perform calculation on the color values of the at least two pixels according to a preset algorithm, and use a result of the calculation as the target color value, where the algorithm includes: using a color value that appears most from the color values of the at least two pixels as the target color value; or calculating an average of the color values of the at least two pixels, and using the average as the target color value.

With reference to the second aspect and the foregoing implementation manner, in a ninth implementation manner of the second aspect, the color value determining unit is further configured to perform second processing on the target color value, and use a target color value after the second processing as a color value of the interface control, where the second processing includes at least one of the following processing: blurring processing, transparent processing, blackening processing, or color-changing processing.

According to a third aspect, a terminal device is provided, where the terminal device includes: a display, configured to present an operation interface corresponding to a function provided by the terminal device; and a processor, configured to: acquire at least one pixel from a desktop wallpaper of the operation interface, acquire a color value of the at least one pixel, and determine, according to the color value of the at least one pixel, a color value of each pixel in the interface control of the operation interface.

With reference to the third aspect, in a first implementation manner of the third aspect, the processor is configured to acquire a target image block from the desktop wallpaper according to a preset rule, where the target image block includes the at least one pixel.

With reference to the third aspect and the foregoing implementation manner, in a second implementation manner of the third aspect, the processor is configured to acquire the target image block from the desktop wallpaper according to a preset position; and/or acquire the target image block from the desktop wallpaper according to a preset size.

With reference to the third aspect and the foregoing implementation manner, in a third implementation manner of the third aspect, the processor is configured to acquire the target image block from the desktop wallpaper according to a position of the interface control on a screen, so that a position of the target image block in the desktop wallpaper corresponds to the position of the interface control on the screen.

With reference to the third aspect and the foregoing implementation manner, in a fourth implementation manner of the third aspect, the processor is configured to acquire the target image block from the desktop wallpaper according to a size of the interface control, so that a size of the target image block is larger than or equal to the size of the interface control.

With reference to the third aspect and the foregoing implementation manners, in a fifth implementation manner of the third aspect, if a quantity of the pixel is one, the processor is configured to use the color value of the pixel as the color value of each pixel in the interface control; or if a quantity of the pixel is at least two, the processor is configured to use color values of the at least two pixels as a color value of each corresponding pixel in the interface control.

With reference to the third aspect and the foregoing implementation manner, in a sixth implementation manner of the third aspect, the processor is further configured to: perform first processing on the color value of each pixel in the interface control, and acquire a color value of each pixel after the first processing, where the first processing includes at least one of the following processing: blurring processing, transparent processing, blackening processing, or color-changing processing.

With reference to the third aspect and the foregoing implementation manners, in a seventh implementation manner of the third aspect, if a quantity of the pixel is at least two, the processor is configured to determine a target color value according to color values of the at least two pixels; and determine a color of the interface control according to the target color value.

With reference to the third aspect and the foregoing implementation manner, in an eighth implementation manner of the third aspect, the processor is configured to perform calculation on the color values of the at least two pixels according to a preset algorithm, and use a result of the calculation as the target color value, where the algorithm includes: using a color value that appears most from the color values of the at least two pixels as the target color value; or calculating an average of the color values of the at least two pixels, and using the average as the target color value.

With reference to the third aspect and the foregoing implementation manner, in a ninth implementation manner of the third aspect, the processor is further configured to perform second processing on the target color value, and use a target color value after the second processing as a color value of the interface control, where the second processing includes at least one of the following processing: blurring processing, transparent processing, blackening processing, or color-changing processing.

According to the method and the apparatus for determining a color of an interface control in the embodiments of the present disclosure, at least one pixel is determined from a desktop wallpaper, and the color of the interface control is determined according to a color value of the at least one pixel, so that color and style matching between the desktop wallpaper and the interface control can be implemented, thereby enhancing visual attraction of a user interface and improving user experience.

BRIEF DESCRIPTION OF DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly and completely describes the technical solutions in some embodiments of the disclosure with reference to the accompanying drawings. Apparently, the described embodiments are some but not all of the embodiments of the disclosure. All other embodiments obtained by a person of ordinary skill in the art based on the embodiments of the present application without creative efforts shall fall within the protection scope of the present invention.

The technical solutions of the present application may be applied to various devices that present a user interface for a user by using a screen (or a display), such as a smartphone, a tablet computer, and a personal computer. For ease of understanding and description, the foregoing devices are collectively referred to as "terminal devices" in the following description.

A user interface (UI) is also referred to as an interface of a user, which is a medium for interaction and information exchange between a system and a user. The user interface implements conversion between an internal form of information and an acceptable form for human being. The user interface includes software and hardware parts for implementing information exchange between a user and a system. The software part includes processing software, such as a convention and an operation command for information exchange between a user and a system. The hardware part includes an input apparatus and an output apparatus (including but not limited to a display screen, a touchscreen, a soft keyboard, a virtual control, a physical keyboard, a function key (such as a volume control pushbutton and a switch pushbutton), a trackball, a mouse, a joystick, a camera, and an input and output apparatus that can be implemented in future technologies). A purpose of the user interface is to enable a user to clearly perform an operation on hardware conveniently and efficiently, so as to implement interaction and complete work that is expected to be completed by using the hardware. The user interface has a broad definition and a user interface exits in any field involved in information communication between human being and a machine.

In some embodiments, a user interface may include a graphical user interface, that is, a graphical user interface (GUI), which is a most common user interface in the world nowadays. For example, an interface of a mobile phone displayed in a power-on state is a graphical user interface, and a user performs interaction with hardware of a device by using a displayed graph (an icon), a virtual keyboard (soft keyboard), and a virtual mouse. The foregoing information in interaction and information exchange between the system and the user may include auditory information, visual information, tactile information, action information, odor information, and the like. The user may directly perform information exchange with the system in the user interface, and may also use devices including a stylus and a touch glove to perform interaction with the system.

In certain embodiments, a desktop wallpaper refers to an image of a main user interface (generally the first interface that appears after unlocking) that is displayed on a screen.

In some embodiments of the disclosure, the interface control is a graphic component presented on an operation interface, where the graphic component has an execution function or a function of responding to a trigger event.

The interface control refers to a visual graphic "component" that can be placed on the user interface, such as a button and a file edit box. The component generally has an execution function or a function of triggering code to run by using a "trigger event" and completing a response. A response to the trigger event refers to a response of a control to an input operation (for example, an operation on a keyboard, a mouse or a touchscreen). Any control has its event collection. If an event of a control occurs, execution of a corresponding event procedure may be triggered. An event object has its particular name, event procedure code is written by a programmer according to a problem or requirement of the programmer. In some embodiments of the disclosure, used as an example but not a limitation, an interface control may include a tab (Tab), a title bar (Title bar), an action bar (Action bar), a progress bar (Progress bar), a check box (Checkbox), and the like.

It should be understood that, the above-enumerated user interface is only one embodiment of the disclosure and should not be limited thereto. Another user interface that can be presented to a user on a screen or the like for the user to perform an operation falls within the protection scope of the disclosure.

In addition, aspects or features of the disclosure may be implemented as a method, an apparatus or a product that uses standard programming and/or engineering technologies. The term "product" used in this application covers a computer program that can be accessed from any computer readable component, carrier or medium. For example, the computer readable medium may include but is not limited to: a magnetic storage component (for example, a hard disk, a floppy disk or a magnetic tape), an optical disc (for example, a CD (Compact Disk, compact disk), a DVD (Digital Versatile Disk, digital versatile disk), a smart card and a flash memory component (for example, EPROM (Erasable Programmable Read-Only Memory, erasable programmable read-only memory), a card, a stick, or a key drive). In addition, various storage media described in this specification may indicate one or more devices and/or other machine readable media that is used to store information. The term "machine readable media" may include but is not limited to a radio channel, and various other media that can store, contain and/or carry an instruction and/or data.

Figure 1:
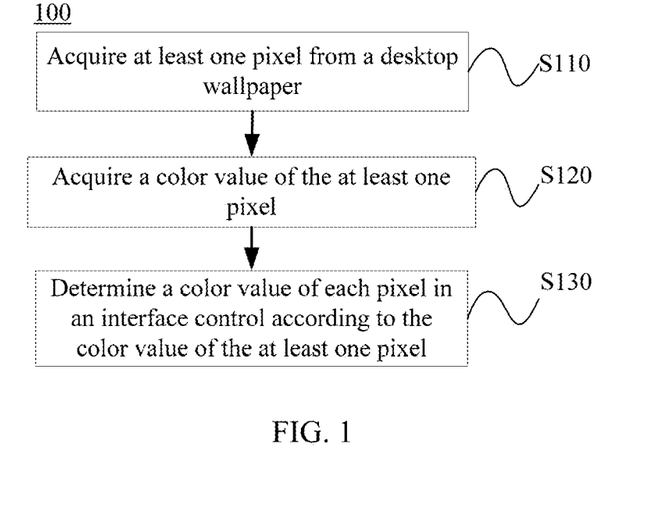
FIG. 1 is a schematic flowchart of a method for determining a color of an interface control according to an embodiment of the disclosure.

FIG. 1 shows a schematic flowchart of a method 100 for determining a color of an interface control according to an embodiment of the disclosure. As shown in FIG. 1, the method 100 includes:

S110. Acquire at least one pixel from a desktop wallpaper.

S120. Acquire a color value of the at least one pixel.

S130. Determine a color value of each pixel in the interface control according to the color value of the at least one pixel.

According to the method for determining a color of an interface control in this embodiment of the disclosure, at least one pixel is determined from a desktop wallpaper, and the color of the interface control is determined according to a color value of the at least one pixel, so that color and style matching between the desktop wallpaper and the interface control can be implemented, thereby enhancing visual attraction of a user interface, improving operational efficiency of a terminal device, and improving user experience.

In S110, a terminal device may randomly acquire the at least one pixel from the desktop wallpaper, which is not specially limited in the present disclosure. For example, optionally, the acquiring at least one pixel from a desktop wallpaper includes: acquiring a target image block from the desktop wallpaper according to a preset rule, where the target image block includes the at least one pixel.

The terminal device may acquire an image block (that is, the target image block) from a currently used desktop wallpaper according to the preset rule.

The target image block includes at least one pixel, that is, in this embodiment of the disclosure, the target image block may be a pixel in the desktop wallpaper, or the target image block may also be an image that is formed by some (more than two) pixels in the desktop wallpaper, or the target image block may also be an entire desktop wallpaper (that is, including all pixels in the desktop wallpaper), which is not specially limited in the present disclosure.

Without loss of generality, the following description is based on a case in which the target image block includes some (more than two) pixels in the desktop wallpaper.

Optionally, the acquiring a target image block from a currently used desktop wallpaper according to a preset rule includes: acquiring the target image block from the desktop wallpaper according to a preset position; and/or acquiring the target image block from the desktop wallpaper according to a preset size.

In this embodiment of the disclosure, a position-based rule (that is case 1) and a size-based rule (that is, case 2) may be enumerated and used as the preset rule. The following respectively describes the foregoing two cases.

Case 1

Optionally, the acquiring a target image block from a currently used desktop wallpaper according to a preset position includes: acquiring the target image block from the desktop wallpaper according to a position of the interface control on a screen, so that a position of the target image block in the desktop wallpaper is corresponding to the position of the interface control on the screen.

In this embodiment of the disclosure, the terminal device may acquire the target image block from the desktop wallpaper according to a position (hereinafter referred to as a target position) of an interface control whose color needs to be changed on the screen.

Figure 2:
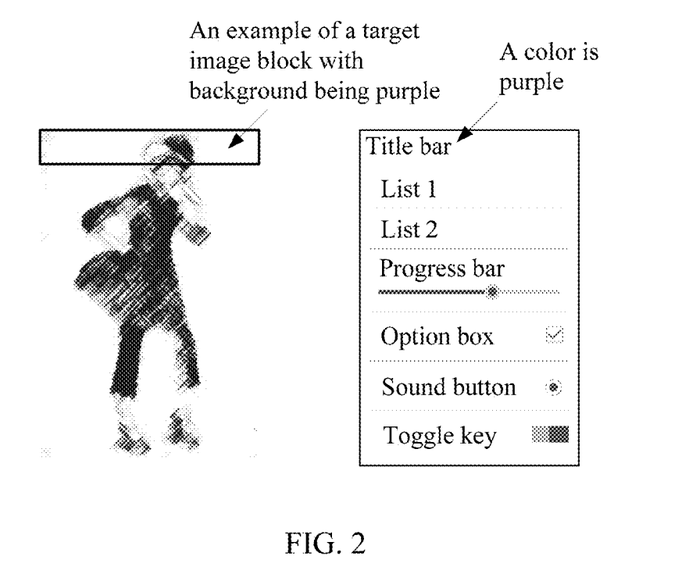
FIG. 2 is a schematic diagram of an example of a correspondence between an interface control and a target image block according to an embodiment of the disclosure.
Figure 3:
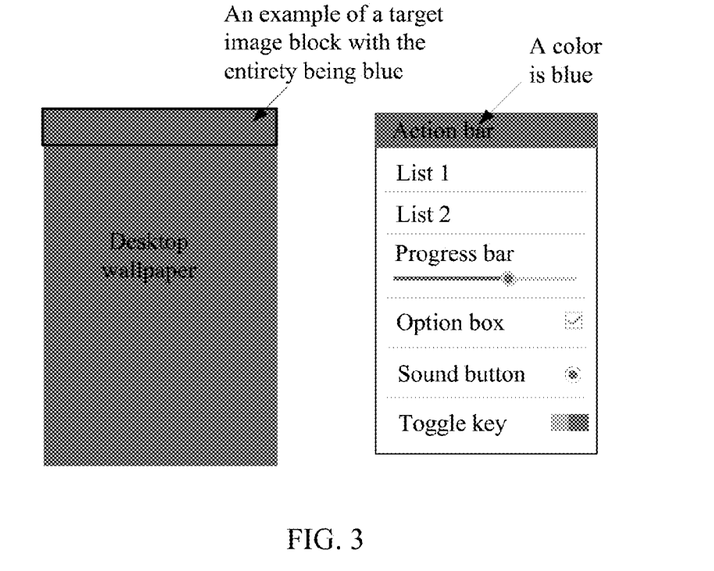
FIG. 3 is a schematic diagram of another example of a correspondence between an interface control and a target image block according to an embodiment of the disclosure.
Figure 4:
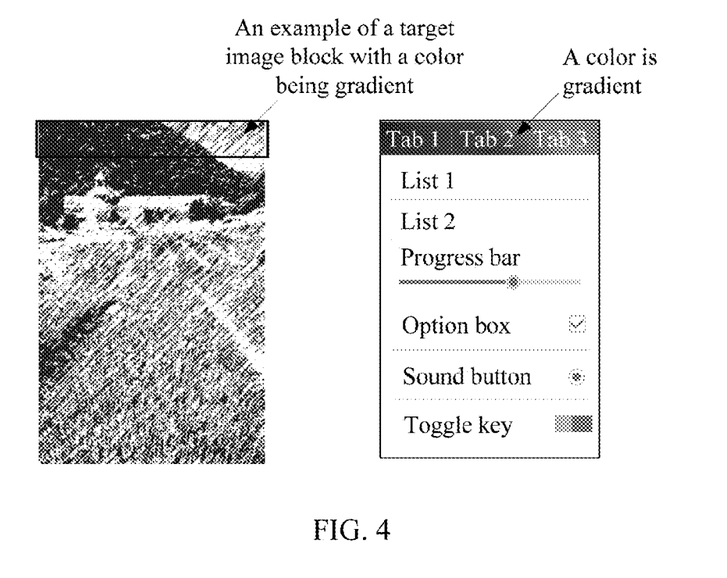
FIG. 4 is a schematic diagram of still another example of a correspondence between an interface control and a target image block according to an embodiment of the disclosure.

As shown in FIG. 2 to FIG. 4, without loss of generality, in an example in which a title bar is used as an interface control whose color needs to be changed, a terminal may determine a position of the title bar on the screen, for example, the terminal may acquire coordinates of a pixel in the upper left corner of the title bar, and a width and a height of the title bar, so as to determine the position of the title bar.

In this way, a position of the target image block in the desktop wallpaper may be determined according to the position of the title bar on the screen.

For example, in a case in which the desktop wallpaper is displayed in full screen (that is, a status shown in FIG. 2), an image block located or approximately located in the foregoing target position may be acquired from the desktop wallpaper as the target image block.

It should be understood that, because of generation of an actual error, a specific offset is allowed to exist between a position of the target image block on the screen and a position of the interface control on the screen, or a specific offset is allowed to exist between a size of the target image block and a size of the interface control.

Moreover, the above-enumerated method for determining, according to a position of the title bar on the screen, the position of the target image block in the desktop wallpaper is only an exemplary description and is not limited thereto. For example, in a case in which the desktop wallpaper cannot be displayed in full screen for reasons such as a size of the desktop wallpaper (for example, a desktop wallpaper is tiled, or covers only a part of the screen), a position of the desktop wallpaper on the screen may also be first located. And the target image block is determined based on the position of the desktop wallpaper on the screen and a position of an interface control on the screen, so that a position relationship between the target image block and the desktop wallpaper is consistent with or is approximately consistent with a position relationship between the interface control and the screen. In addition, in this case, a size proportion between the target image block and the desktop wallpaper is consistent with or approximately consistent with a size proportion between the interface control and the screen.

It should be understood that, the above-enumerated method for acquiring by the terminal device, according to the position of the interface control on the screen, the target image block from the desktop wallpaper, is only one example of the position-based rule and is not limited thereto. For example, according to the position-based rule, the method may further be that an image block at a fixed position in the desktop wallpaper is selected; for example, an image located in a ⅓ upper part of the desktop wallpaper may be selected as the target image block, an image located in a ⅓ middle part of the desktop wallpaper may be selected as the target image block, or an image located in a ⅓ lower part of the desktop wallpaper may be selected as the target image block. In addition, the above-enumerated positions (or coverage areas) of image blocks in the desktop wallpaper are only exemplary description, which is not specially limited in the present disclosure and may be changed randomly.

In addition, according to the position-based rule, an image block based on user selection may further be enumerated as the target image block. For example, in a case in which the method 100 is applied to a touch display, after a procedure of the method 100 is started, in S110, a touch signal of the touch display may further be detected, and a position of the touch display from which the touch signal comes is determined, so that an image block presented at the position is used as the target image block. In addition, an icon for instructing a user to select the target image block may further be presented on the display.

According to the method 100 for determining a color of an interface control in this embodiment of the disclosure, it may be satisfied that a user generates or changes a color of an interface control in a timely manner according to the user's preference and requirement, and a current color of a desktop wallpaper, thereby improving operation efficiency and user experience.

Case 2

Optionally, the acquiring the target image block from a currently used desktop wallpaper according to a preset size includes: acquiring the target image block from the desktop wallpaper according to a size of the interface control, so that a size of the target image block is larger than or equal to the size of the interface control.

In this embodiment of the disclosure, the size of the target image block may be determined according to the size of the interface control, for example, the size of the target image block may be consistent with the size of the interface control, or the size of the target image block may be larger than the size of the interface control, so that it may be ensured that a quantity of pixels of the target image block is greater than or equal to a quantity of pixels of the interface control. For example, when a color value of a pixel of the target image block is directly used as a color value of a pixel of the interface control, it can be ensured that every pixel of the interface control can obtain a corresponding color value.

It should be understood that, the above-enumerated relationship between the size of the target image block and the size of the interface control is only exemplary description and is not limited thereto. For example, the size of the target image block may also be smaller than the size of the interface control. In this case, for example, two or more (for example, adjacent) pixels in the interface control may be enabled to use a color value of a same pixel in the target image block.

It should be understood that, the above-enumerated position-based rule and size-based rule that are used as the preset rule are only exemplary description and is not limited thereto. For example, a most characteristic image block, for example, a face image block in a character image, may further be determined from the desktop wallpaper by using various algorithms, and is used as the target image block.

After at least one pixel is acquired according to the foregoing description, a pixel value of the at least one pixel may be acquired in S120. In this embodiment of the disclosure, a method for acquiring a color value of a pixel, for example, may be implemented by using a getPixels (getPixels) function in a bitmap (Bitmap), where the getPixels function may be expressed as:

getPixels (pixels, offset, stride, x, y, width, height), where:

pixels denote an array of bitmap color values acquired based on an image (which is a desktop wallpaper here); offset denotes a first pixel index value that is read; stride denotes a quantity of row spacings; x denotes an x coordinate value of the first pixel that is read; y denotes a y coordinate value of the first pixel that is read; width denotes a pixel width that is read from each row; and height denotes a quantity of rows that are read.

For example, it is assumed that a width of the desktop wallpaper is w and a height of the desktop wallpaper is h. In this case, pixels may be determined according to a color value of each pixel of the desktop wallpaper, and w and h; stride is w, the parameter offset is determined based on a position of a pixel in the upper left corner of the target image block in the desktop wallpaper; the parameters x and y are a start position of a screenshot; and the parameters width and height are a width and a height of the screenshot, that is, the target image block is the screenshot that is read from (x, y) point of the desktop wallpaper, the size of the screenshot is width×height, and then a color value of the target image block is calculated.

In this case, because the color value of each pixel of the desktop wallpaper is input in the foregoing, the foregoing acquired data may be directly used as the color value of each pixel of the target image block in S120.

It should be understood that, the above-enumerated method for acquiring a color value of each pixel of the target image block is only exemplary description and is not limited thereto. In a case in which the target image block is acquired from the desktop wallpaper by using another method, a color value of each pixel of the target image block may be read by using drawing software and the like. Alternatively, a color value of each pixel may be acquired by using another parameter of each pixel, for example, an ARGB value may be converted to a color value.

After the color value of each pixel of the target image block is acquired according to the foregoing description, the color of the interface control may be determined in S130.

Optionally, if a quantity of the pixel is one, the determining a color value of each pixel in the interface control according to the color value of the at least one pixel includes: using the color value of the pixel as the color value of each pixel in the interface control.

When the target image block includes only one pixel, the color value of the pixel may be directly used as the color value of each pixel in the interface control, thereby determining the color of the interface control.

Optionally, if a quantity of the pixel is at least two, the determining a color value of each pixel in the interface control according to the color value of the at least one pixel includes: using color values of the at least two pixels as a color value of each corresponding pixel in the interface control.

For example, if the size of the target image block is the same as or approximately the same as the size of the interface control (or a quantity of pixels included in the target image block is the same as or approximately the same as a quantity of pixels included in the interface control), a color value of each pixel in the target image block may be used as the color value of each corresponding pixel (for example, having a same relative position) in the interface control, so that the color of the interface control is determined.

Likewise, if a quantity of acquired pixels is the same as or approximately the same as the quantity of pixels included in the interface control, the color value of each pixel may be used as the color value of each corresponding pixel (for example, having a same relative position) in the interface control, so that the color of the interface control is determined.

For another example, if the size of the target image block is corresponding to the size of the interface control (for example, a quantity of pixels included in the target image block is an integer multiple of a quantity of pixels included in the interface control), a color value of a pixel at a specified position in the target image block may be used as the color value of each corresponding pixel (for example, having a same relative position) in the interface control, so that the color of the interface control is determined. For example, if the quantity of pixels included in the target image block is twice the quantity of pixels included in the interface control (for example, the quantity of pixels included in the target image block is the same as the quantity of pixels included in the interface control in the y direction, the quantity of pixels included in the target image block is twice the quantity of pixels included in the interface control in the x direction), a color value of a pixel whose coordinate in x direction is an even number (or an odd number) in the target image block may be used as the color value of each corresponding pixel in the interface control. The specified position may be set by a system or a user.

Likewise, if the quantity of acquired pixels corresponds to the quantity of pixels included in the interface control (for example, a quantity of selected pixels is an integer multiple of the quantity of pixels included in the interface control), a color value of a pixel at a specified position in the acquired pixels may be used as the color value of each corresponding pixel (for example, having a same relative position) in the interface control, so that the color of the interface control is determined.

For another example, if the size of the target image block is smaller than the size of the interface control, in this case, two or more (for example, adjacent) pixels in the interface control may be enabled to use a color value of a same pixel in the target image block.

Likewise, if the quantity of acquired pixels is smaller than the quantity of pixels included in the interface control, two or more (for example, adjacent) pixels in the interface control may be enabled to use a color value of a same pixel.

Optionally, the method further includes: performing first processing on the color value of each pixel in the interface control, and acquiring a color value of each pixel after the first processing, where the first processing includes at least one of the following processing: blurring processing, transparent processing, blackening processing, or color-changing processing.

In this embodiment of the disclosure, blurring processing, transparent processing, or color-changing processing may be performed on the foregoing determined color value of the interface control, and a color of the interface control is determined according to a processed color value.

In addition, different processing manners may further be used according to different light and dark conditions of a wallpaper. For example, if an overall color style of a desktop wallpaper is relatively dark, blurring or blackening processing may be performed on the target image block in a case in which a color style of the target image block (for example, the foregoing determined color value of the interface control) is relatively light.

Optionally, if a quantity of the pixel is at least two, the determining a color value of each pixel in the interface control according to the color value of the at least one pixel includes: determining a target color value according to color values of the at least two pixels; and determining the color value of each pixel in the interface control according to the target value color.

For example, if the target image block includes multiple pixels with different colors, or at least one pair of different color values exists in the foregoing acquired color values of pixels of the target image block, a target color value may be determined from multiple (at least two) different color values, and a color value of each pixel in the interface control is determined according to the target color value.

Optionally, the determining a target color value according to color values of the at least two pixels includes: performing calculation on the color values of the at least two pixels according to a preset algorithm, and using a result of the calculation as the target color value, where the algorithm includes: using a color value that appears most from the color values of the at least two pixels as the target color value.

In this embodiment of the disclosure, times of color values may be counted, and a color value that appears most may be considered as a dominant hue of the target image block, so that the color value may be used as the target color value.

Optionally, the determining a target color value according to color values of the at least two pixels includes: performing calculation on the color values of the at least two pixels according to a preset algorithm, and using a result of the calculation as the target color value. The algorithm may include calculating an average of the color values of the at least two pixels and using the average as the target color value.

In this embodiment of the disclosure, if the algorithm is that an average (which may include an arithmetic mean or a weighted mean) of color values of pixels is calculated, an average of color values of pixels is calculated, and the average is used as the target color value.

It should be understood that, the above-enumerated method for determining the target color value is only exemplary description and is not limited thereto. All algorithms that can achieve an inventive purpose of the disclosure shall fall within the protection scope of the embodiments provided in this disclosure. For example, a pixel may also be randomly selected from the target image block, and a color value of the pixel is used as the target color value.

After the target color value is determined according to the foregoing description, a color value of each pixel in the interface control may be determined according to the target color value, so that a color of the interface control is determined.

For example, the determining the color value of each pixel in the interface control according to the target value color includes: performing second processing on the target color value, and using a target color value after the second processing as the color value of each pixel in the interface control. The second processing includes at least one of the following processing: blurring processing, transparent processing, blackening processing, or color-changing processing.

The blurring processing, transparent processing, blackening processing, or color-changing processing may be performed on the foregoing determined color value of the interface control, and a color of the interface control is determined according to a processed color value.

Here, the foregoing color-changing processing may include color gradient processing, that is, a color of the target image block is gradually deepened or lightened, so that multiple color values are acquired, and sequentially assigned to pixels of the interface control in a specific order (for example, from light to dark or from dark to light), so that the interface control is presented in gradient colors.

In addition, different processing manners may further be used according to different light and dark conditions of a wallpaper. For example, if an overall color style of a desktop wallpaper is relatively dark, blurring or blackening processing may be performed on a target color in a case in which a target color value is relatively light.

Optionally, the acquiring a target image block from a desktop wallpaper according to a preset rule includes: when the desktop wallpaper is changed, acquiring the target image block from a changed desktop wallpaper according to the preset rule.

Specifically, the method 100 for determining a color of the interface control according to this embodiment of the present invention may be performed when a terminal device detects that a user changes a desktop wallpaper. So that after the user changes the desktop wallpaper, an interface control whose color is consistent with a style of the changed desktop wallpaper is generated in a timely manner for the user, thereby further improving user experience.

Moreover, the method 100 for determining a color of an interface control according to this embodiment of the disclosure may also be performed periodically, which is not specially limited in the present disclosure.

According to the method for determining a color of an interface control in this embodiment of the disclosure, at least one pixel is determined from a desktop wallpaper. Additionally, the color of the interface control is determined according to a color value of the at least one pixel, so that color and style matching between the desktop wallpaper and the interface control can be implemented, thereby enhancing visual attraction of a user interface and improving user experience.

Figure 5:
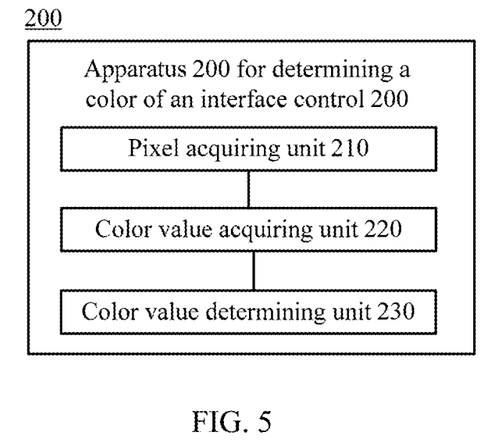
FIG. 5 is a schematic block diagram of an apparatus for determining a color of an interface control according to an embodiment of the disclosure.

With reference to FIG. 1 and FIG. 4, the foregoing describes the method for determining a color of an interface control in detail according to some embodiments of the disclosure. With reference to FIG. 5, the following describes an apparatus for determining a color of an interface control in detail according to an embodiment of the disclosure.

FIG. 5 shows a schematic block diagram of an apparatus 200 for determining a color of an interface control. As shown in FIG. 5, the apparatus 200 includes: a pixel acquiring unit 210, configured to acquire at least one pixel from a desktop wallpaper; a color value acquiring unit 220, configured to acquire a color value of the at least one pixel; and a color value determining unit 230, configured to determine a color value of each pixel in the interface control according to the color value of the at least one pixel.

Optionally, the pixel acquiring unit 210 is configured to acquire a target image block from the desktop wallpaper according to a preset rule, where the target image block includes the at least one pixel.

Optionally, the pixel acquiring unit 210 is configured to acquire the target image block from the desktop wallpaper according to a preset position; and/or acquire the target image block from the desktop wallpaper according to a preset size.

Optionally, the pixel acquiring unit 210 is configured to acquire the target image block from the desktop wallpaper according to a position of the interface control on a screen, so that a position of the target image block in the desktop wallpaper is corresponding to the position of the interface control on the screen.

Optionally, the pixel acquiring unit 210 is configured to acquire the target image block from the desktop wallpaper according to a size of the interface control, so that a size of the target image block is larger than or equal to the size of the interface control.

Optionally, if a quantity of the pixel is one, the color value determining unit 230 is configured to use the color value of the pixel as the color value of each pixel in the interface control; or if a quantity of the pixel is at least two, the color value determining unit 230 is configured to use color values of the at least two pixels as a color value of each corresponding pixel in the interface control.

Optionally, the color value determining unit 230 is further configured to: perform first processing on the color value of each pixel in the interface control, and acquire a color value of each pixel after the first processing, where the first processing includes at least one of the following processing: blurring processing, transparent processing, blackening processing, or color-changing processing.

Optionally, if a quantity of the pixel is at least two, the color value determining unit 230 is configured to determine a target color value according to color values of the at least two pixels; and determine a color of the interface control according to the target color value.

Optionally, the color value determining unit 230 is configured to perform calculation on the color values of the at least two pixels according to a preset algorithm, and use a result of the calculation as the target color value, where the algorithm includes: using a color value that appears most from the color values of the at least two pixels as the target color value; or calculating an average of the color values of the at least two pixels, and using the average as the target color value.

Optionally, the color value determining unit 230 is further configured to perform second processing on the target color value, and use a target color value after the second processing as a color value of the interface control, where the second processing includes at least one of the following processing: blurring processing, transparent processing, blackening processing, or color-changing processing.

The apparatus 200 for determining a color of an interface control according to this embodiment of the present disclosure may correspond to an execution body of a method of the embodiments of the disclosure, and units in the apparatus 200 for determining a color of an interface control and the foregoing operations and/or functions are respectively for implementing corresponding procedures of the method 100 in FIG. 1. For brevity, details are not described herein again.

According to the apparatus for determining a color of an interface control in this embodiment of the disclosure, a target image block is determined from a desktop wallpaper, and the color of the interface control is determined according to a color value of a pixel in the target image block, so that color and style matching between the desktop wallpaper and the interface control can be implemented, thereby enhancing visual attraction of a user interface and improving user experience.

Figure 6:
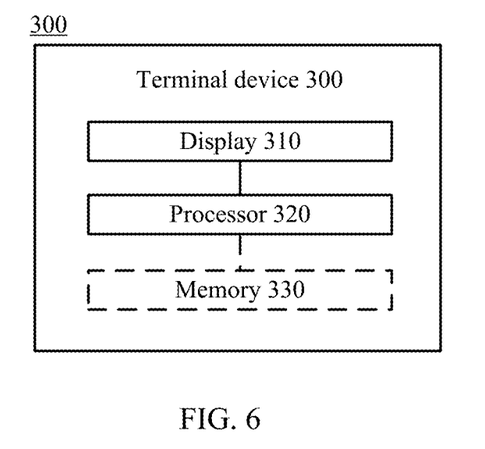
FIG. 6 is a schematic structural diagram of a device for determining a color of an interface control according to an embodiment of the disclosure.

With reference to FIG. 1 and FIG. 4, the foregoing describes the method for determining a color of an interface control in detail according to the embodiments of the disclosure. With reference to FIG. 6, the following describes a terminal device in detail that is applicable to the method for determining a color of an interface control according to an embodiment of the disclosure.

FIG. 6 shows a schematic block diagram of a terminal device 300 that is applicable to the method for determining a color of an interface. The terminal device 300 includes: a display 310, configured to present an operation interface corresponding to a function provided by the terminal device; and a processor 320, configured to: acquire at least one pixel from a desktop wallpaper of the operation interface, acquire a color value of the at least one pixel, and determine, according to the color value of the at least one pixel, a color value of each pixel in the interface control of the operation interface.

Optionally, the processor 320 is configured to acquire a target image block from the desktop wallpaper according to a preset rule, where the target image block includes the at least one pixel.

Optionally, the processor 320 is configured to acquire the target image block from the desktop wallpaper according to a preset position; and/or acquire the target image block from the desktop wallpaper according to a preset size.

Optionally, the processor 320 is configured to acquire the target image block from the desktop wallpaper according to a position of the interface control on a screen, so that a position of the target image block in the desktop wallpaper is corresponding to the position of the interface control on the screen.

Optionally, the processor 320 is configured to acquire the target image block from the desktop wallpaper according to a size of the interface control, so that a size of the target image block is larger than or equal to the size of the interface control.

Optionally, if a quantity of the pixel is one, the processor 320 is further configured to use the color value of the pixel as the color value of each pixel in the interface control; or if a quantity of the pixel is at least two, the processor 320 is configured to use color values of the at least two pixels as a color value of each corresponding pixel in the interface control.

Optionally, the processor 320 is further configured to: perform first processing on the color value of each pixel in the interface control, and acquire a color value of each pixel after the first processing, where the first processing includes at least one of the following processing: blurring processing, transparent processing, blackening processing, or color-changing processing.

Optionally, if a quantity of the pixel is at least two, the processor 320 is configured to determine a target color value according to color values of the at least two pixels; and determine a color of the interface control according to the target color value.

Optionally, the processor 320 is specifically configured to perform calculation on the color values of the at least two pixels according to a preset algorithm, and use a result of the calculation as the target color value, where the algorithm includes: using a color value that appears most from the color values of the at least two pixels as the target color value; or calculating an average of the color values of the at least two pixels, and using the average as the target color value.

Optionally, the processor 320 is further configured to perform second processing on the target color value, and use a target color value after the second processing as a color value of the interface control, where the second processing includes at least one of the following processing: blurring processing, transparent processing, blackening processing, or color-changing processing.

Moreover, in this embodiment of the disclosure, the terminal device 300 may further include a memory 330, and the memory 330 may include a random access memory (RAM) and a read only memory (ROM), or any fixed storage medium, or a removable storage medium, and is configured to store a program that is executed by the processor 320 and can implement the embodiments of the present disclosure, or to-be-processed data in the embodiments of the present disclosure, or various preset rules and algorithms.

In addition, the processor 320 and the memory 330 may also be integrated into a physical device that is applied to the embodiments of the present invention, and the physical device stores and runs a program that implements some embodiments of the disclosure.

In some embodiments of the disclosure, components of the terminal device 300 are coupled together by using a bus. The bus includes a data bus, and further includes a power bus, a control bus, and a status signal bus.

The processor 320 can implement or execute the steps, and the logical block diagrams disclosed in the embodiments of the disclosure. The processor 320 may be a microprocessor, or the processor may also be any conventional processor or decoder, or the like. The steps of the methods disclosed may be directly executed by a hardware processor, or executed by a combination of hardware and software modules in a decoding processor. The software module may be located in a mature storage medium in the art, such as a random access memory, a flash memory, a read-only memory, a programmable read-only memory or an electrically erasable programmable memory, or a register. The storage medium is located in the memory. The processor reads information from the memory, and completes the steps of the foregoing methods in combination with the hardware.

It should be understood that, in this embodiment of the present invention, the processor 320 may be a central processing unit (CPU), may also be a graphic processing unit (GPU), and may also be another general purpose processor, digital signal processor (DSP), application-specific integrated circuit (ASIC), a field programmable gate array (FPGA), or another programmable logic device, a discrete gate, or a transistor logic device, a discrete hardware assembly, and the like. The general purpose processor may be a microprocessor, or the processor may also be any conventional processor, or the like.

The memory may include a read-only memory and a random access memory, and provide an instruction and data for the processor 320. A part of the memory may further include a nonvolatile random access memory. For example, the memory may further store information of a device type.

In an implementation process, the steps in the foregoing methods may be completed by means of an integrated logic circuit of hardware in the processor 320 or an instruction in a form of software. The steps of the methods disclosed in the embodiments of the disclosure may be directly executed by a hardware processor, or executed by a combination of hardware and software modules in a processor. The software module may be located in a mature storage medium in the art, such as a random access memory, a flash memory, a read-only memory, a programmable read-only memory or an electrically erasable programmable memory, or a register.

The terminal device 300 that is applicable to the embodiments of the present disclosure may correspond to an execution body of a method 100 of the embodiments of the disclosure, and units in the terminal device 300 and the foregoing operations and/or functions are respectively for implementing corresponding procedures of the method 100 in FIG. 1. For brevity, details are not described herein again.

According to the device for determining a color of an interface control in this embodiment of the disclosure, a target image block is determined from a desktop wallpaper, and the color of the interface control is determined according to a color value of a pixel in the target image block, so that color and style matching between the desktop wallpaper and the interface control can be implemented, thereby enhancing visual attraction of a user interface and improving user experience.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different apparatuses to implement the described functions for each particular application, but it should not be considered that the implementation goes beyond the scope of the present invention.

It may be clearly understood by a person skilled in the art that, for ease and brevity of description, for a detailed working process of the foregoing system, apparatus, and unit, reference may be made to a corresponding process in the foregoing apparatus embodiments, and details are not described herein again.

In the several embodiments provided in the present application, it should be understood that the disclosed system, apparatus, and apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the purposes of the solutions of the embodiments.

In addition, functional units in the embodiments of the present invention may be integrated into one processor, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the apparatuses described in the embodiments of the disclosure. The foregoing storage medium includes: any medium that can store program code, such as a USB flash drive, a removable hard disk, a ROM, a RAM, a magnetic disk, or an optical disc.

The foregoing descriptions are merely specific implementation manners of certain embodiments of the disclosure, but are not intended to limit the protection scope of the present application. Any variation or replacement readily figured out by a person skilled in the art within the technical scope disclosed in the present invention shall fall within the protection scope of the present application. Therefore, the protection scope of the present application shall be subject to the protection scope of the claims.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

What is claimed is:

1. A method for determining a color of pixels for an interface control displayed on a desktop wallpaper on a screen, wherein the method comprises:
   acquiring, by a processor, a target image block within the desktop wallpaper on the screen according to at least one display characteristic of the interface control, wherein the target image block comprises at least one pixel, and wherein the display characteristic is taken from the group consisting of:
      a position of the interface control on the screen, and
      a size of the interface control;
   acquiring, by the processor, a color value for each pixel of the target image block; and
   determining, by the processor, a color value for each pixel in the interface control,
   wherein the color value for each pixel in the interface control is determined using a color value from the color value for each pixel of the target image block.

2. The method according to claim 1, wherein acquiring the target image block within the desktop wallpaper comprises:
   acquiring the target image block from the desktop wallpaper according to the position of the interface control on the screen,
   wherein a position of the target image block within the desktop wallpaper corresponds to the position of the interface control on the screen.

3. The method according to claim 1, wherein acquiring the target image block within the desktop wallpaper comprises:
acquiring the target image block from the desktop wallpaper according to the size of the interface control, wherein a size of the target image block is larger than or equal to the size of the interface control.

4. The method according to claim 1, wherein:
if a quantity of the at least one pixel is one, determining the color value for each pixel in the interface control includes using the color value of the one pixel to determine the color value for each pixel in the interface control; and
if the quantity of the at least one pixel is at least two, determining the color value for each pixel in the interface control includes using color values of the at least two pixels to determine the color value for each pixel in the interface control.

5. The method according to claim 1, wherein:
if a quantity of the at least one pixel is at least two, determining the color value for each pixel in the interface control includes:
performing, by the processor, a calculation on the color values of the at least two pixels according to a preset algorithm, and using a result of the calculation as a target color value; and
determining the color value for each pixel in the interface control according to the target value color;
wherein, the preset algorithm comprises at least one of the group consisting of:
using a color value that appears most from the color values of the at least two pixels as the target color value; and
calculating an average of the color values of the at least two pixels, and using the average as the target color value.

6. A non-transitory computer readable medium having stored thereon computer executable instructions for determining a color of pixels for an interface control displayed on a desktop wallpaper on a screen according to a method comprising:
acquiring a target image block within the desktop wallpaper on the screen according to at least one display characteristic of the interface control, wherein the target image block comprises at least one pixel, and wherein the display characteristic is taken from the group consisting of:
a position of the interface control on the screen, and
a size of the interface control;
acquiring a color value for each pixel of the target image block; and
determining a color value for each pixel in the interface control,
wherein the color value for each pixel in the interface control is determined using a color value from the color value for each pixel of the target image block.

7. The non-transitory computer readable medium of claim 6, wherein acquiring the target image block within the desktop wallpaper comprises:
acquiring the target image block from the desktop wallpaper according to the position of the interface control on the screen,
wherein a position of the target image block within the desktop wallpaper corresponds to the position of the interface control on the screen.

8. The non-transitory computer readable medium of claim 6,
wherein acquiring the target image block within the desktop wallpaper comprises:
acquiring the target image block from the desktop wallpaper according to the size of the interface control, wherein a size of the target image block is larger than or equal to the size of the interface control.

9. The non-transitory computer readable medium of claim 6, wherein:
if a quantity of the at least one pixel is one, determining the color value for each pixel in the interface control includes using the color value of the one pixel to determine the color value for each pixel in the interface control; and
if the quantity of the at least one pixel is at least two, determining the color value for each pixel in the interface control includes using color values of the at least two pixels to determine the color value for each pixel in the interface control.

10. The non-transitory computer readable medium of claim 6, wherein:
if a quantity of the at least one pixel is at least two, determining the color value for each pixel in the interface control includes:
performing a calculation on the color values of the at least two pixels according to a preset algorithm, and using a result of the calculation as a target color value; and
determining the color value for each pixel in the interface control according to the target value color;
wherein, the preset algorithm comprises at least one of the group consisting of:
using a color value that appears most from the color values of the at least two pixels as the target color value; and
calculating an average of the color values of the at least two pixels, and using the average as the target color value.

11. A terminal device for determining a color of pixels for an interface control displayed on a desktop wallpaper on a screen wherein the terminal device comprises:
a display configured to present an operation interface corresponding to a function provided by the terminal device; and
a processor configured with a non-transitory computer-readable medium including computer-executable instructions for carrying out a method comprising:
acquiring, by a processor, a target image block within the desktop wallpaper on the screen according to at least one display characteristic of the interface control wherein the target image block comprises at least one pixel, and wherein the display characteristic is taken from the group consisting of:
a position of the interface control on the screen, and
a size of the interface control;
acquiring, by the processor, a color value for each pixel of the target image block; and
determining, by the processor, a color value for each pixel in the interface control,
wherein the color value for each pixel in the interface control is determined using a color value from the color value for each pixel of the target image block.

12. The device according to claim 11, wherein acquiring the target image block within the desktop wallpaper comprises:

acquiring the target image block from the desktop wallpaper according to the position of the interface control on the screen,
wherein a position of the target image block within the desktop wallpaper is corresponding to the position of the interface control on the screen.

13. The device according to claim 11, wherein acquiring the target image block within the desktop wallpaper comprises:
acquiring the target image block from the desktop wallpaper according to the size of the interface control,
where a size of the target image block is larger than or equal to the size of the interface control.

14. The device according to claim 11, wherein:
if a quantity of the at least one pixel is one, determining the color value for each pixel in the interface control includes using the color value of the pixel as the color value for each pixel in the interface control; and
if the quantity of the at least one pixel is at least two, the processor is configured to use color values of the at least two pixels to determine the color value for each pixel in the interface control.

15. The device according to claim 14, wherein the processor is further configured to carry out the method including:
performing first processing on the color value for each pixel in the interface control, and
acquiring a color value for each pixel after the first processing, wherein the first processing comprises at least one of the group consisting:
blurring processing, transparent processing, blackening processing, or color-changing processing.

16. The device according to claim 11, wherein:
if a quantity of the at least one pixel is at least two, the processor is configured to:
perform calculation on the color values of the at least two pixels according to a preset algorithm, and use a result of the calculation as the target color value; and
determine a color of the interface control according to the target color value;
wherein the algorithm comprises at least one of the group consisting of:
using a color value that appears most from the color values of the at least two pixels as the target color value; and
calculating an average of the color values of the at least two pixels, and using the average as the target color value.

17. The device according to claim 16, wherein the processor is further configured to perform the method further comprising:
performing second processing on the target color value to render a second target color value, and
using the second target color value to determine the color value for each pixel in the interface control, wherein the second processing comprises at least one of the group consisting of:
blurring processing, transparent processing, blackening processing, and color-changing processing.

* * * * *